Jan. 22, 1963 J. W. McDUFFIE 3,074,343
TYING MECHANISM
Filed Sept. 28, 1961
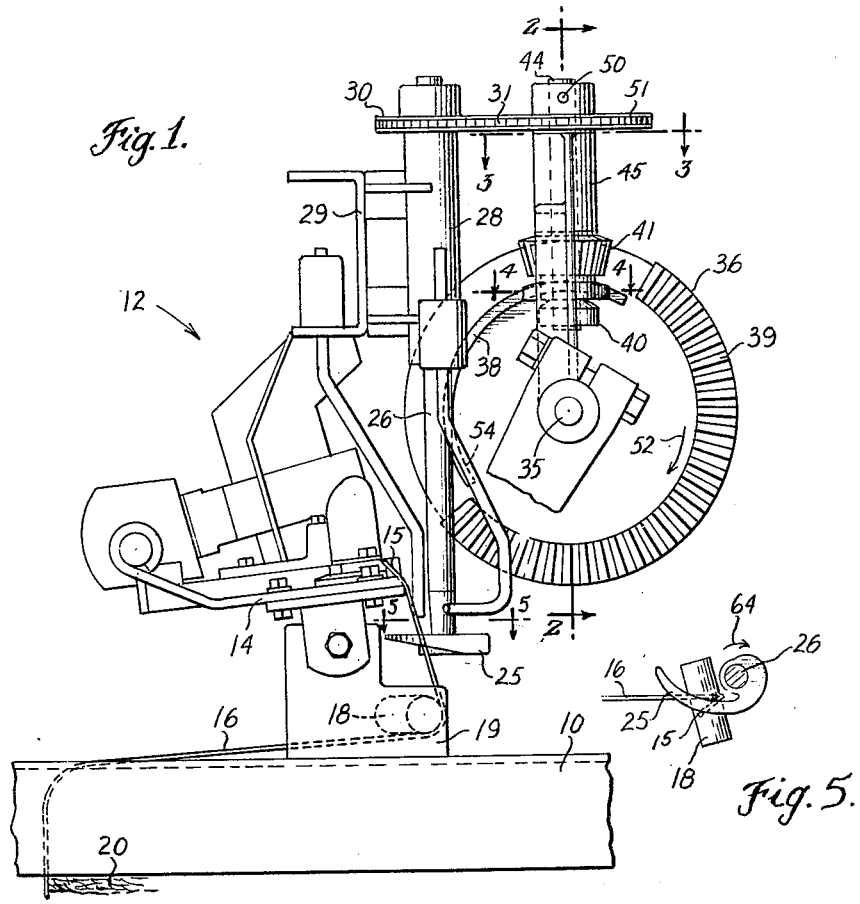
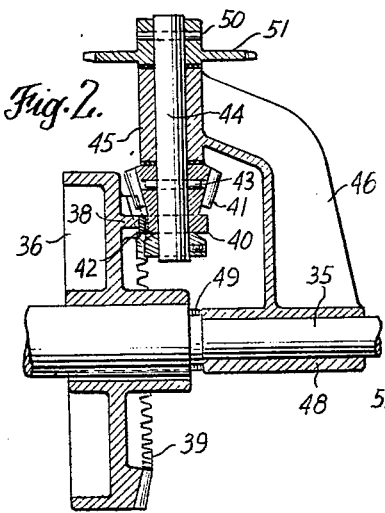
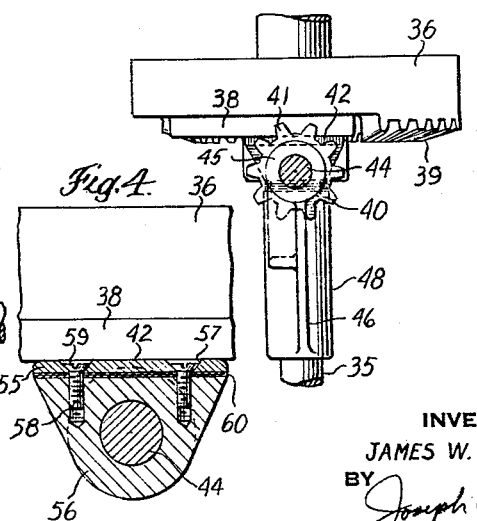
INVENTOR
JAMES W. McDUFFIE
BY
Joseph A. Brown
ATTORNEY ns # United States Patent Office 3,074,343
Patented Jan. 22, 1963

3,074,343
TYING MECHANISM
James W. McDuffie, New Holland, Pa., assignor to Sperry Rand Corporation, New Holland, Pa., a corporation of Delaware
Filed Sept. 28, 1961, Ser. No. 141,484
4 Claims. (Cl. 100—31)

This invention relates generally to tying mechanisms for hay balers and more particularly to means in a tying mechanism for maintaining a pinion and segment gear in proper operative relation to each other.

A conventional tying mechanism has a segment gear mounted on a timer shaft and adapted to rotate one revolution during each tying cycle. The segment gear has a cam section and angularly spaced therefrom are gear teeth. Cooperative with the segment gear is a pinion having a cam and gear teeth which are engagable, successively, with the cam and gear teeth of the segment gear. The engagement of the pinion cam and the segment gear cam holds the pinion teeth in proper position for engagement by the segment gear teeth. If there is excessive clearance between the cams of the gears, and the pinion becomes angularly displaced relative to the segment gear a distance sufficient to enable a tooth to be skipped when the respective gear teeth engage, substantial damage of one or the other gear may result or the mounting structure for the parts may be broken.

Heretofore, proper pinion placement and adjustment relative to the segment gear has been difficult. Close tolerances of these parts have had to be held when the parts are manufactured. In assembly, careful adjustment has been required. However, such adjustment has been difficult to achieve because optimum mesh of the gear teeth of the respective gears may result in improper cam engagement. In like respect, if the cams of the respective gears are properly located, the teeth on the gears may not have a proper mesh. Thus, the overall adjustment provided has had to be a compromise between the two adjustments necessary.

One object of this invention is to provide an improved segment gear, pinion arrangement whereby precise adjustment can be quickly and easily achieved between the gear teeth and the cam surfaces of the respective parts.

Another object of this invention is to provide a segment gear and pinion arrangement whereby proper tooth mesh and proper cam clearance are provided independently of each other.

Another object of this invention is to provide a segment gear and pinion construction in which means is provided to compensate for wear of the engaging cam parts.

Another object of this invention is to provide structure of the character described having adjustment means which greatly decreases the time required by the assembler to set the segment gear and tier pinion relative to each other, thereby reducing manufacturing costs.

A further object of this invention is to provide a segment gear and pinion construction which is of such nature that manufacturing tolerances do not have to be held with the precision required heretofore, thereby further reducing costs.

A still further object of this invention is to provide a structural arrangement which will achieve the foregoing advantages by simple and inexpensive means.

Other objects of this invention will be apparent hereinafter from the specification and from the recital in the appended claims.

In the drawings:

FIG. 1 is a fragmentary side elevation of a wire tie mechanism having segment gear and pinion adjustment means constructed according to this invention;

FIGS. 2 and 3 are sections taken on the lines 2—2 and 3—3 of FIG. 1, respectively, looking in the direction of the arrows;

FIG. 4 is an enlarged section taken on the line 4—4 of FIG. 1 looking in the direction of the arrows; and FIG. 5 is a section taken on the line 5—5 of FIG. 1 looking in the direction of the arrows.

Referring now to the drawings by numerals of reference, and particularly to FIG. 1, 10 denotes the bale case of a hay baler on which is mounted a wire tying mechanism 12. Such mechanism comprises clamping means 14 which holds a free end 15 of a wire 16. Wire 16 extends downwardly from clamping means 14 and around a guide roller 18 carried on a bracket 19 affixed to the bale case. The wire projects across bale case 10, and as a bale 20 is formed therein and moved rearwardly, wire is extended around the top, rear and bottom of the bale. After the bale is completed, needle means, not shown, projects across the bale case to deliver a loop of wire to the tying mechanism. One strand of the loop is twisted with the free end wire 15 to produce a tie and the other strand of the loop is cut and clamped to provide a new free end for the next bale. Such arrangement and operation is purely conventional.

For twisting wires together, a twister hook 25 is provided. Hook 25 is connected to a vertically extending spindle 26 rotatable in a support 28 carried on tier framework 29. Hook 25 is adapted to rotate at the proper time by drive means including a sprocket 30 connected to the upper end of spindle 26, and a chain 31 which drives the sprocket.

Suitably mounted on the bale case 10 is a transversely extending timer shaft 35 on which a segment gear 36 is mounted. The segment gear has an arcuate cam section 38 and a series of gear teeth 39. The gear teeth 39 are located on one side face of the segment gear and such teeth have an arcuate extent in excess of 180°. The cam surface 38 is both angularly and radially spaced from the gear teeth 39, and as shown in FIG. 2, such cam surface comprises a shoulder projecting axially of the segment gear and in the same direction as the teeth 39. The cam section covers the arcuate section of the gear not covered by gear teeth. With the completion of each bale, the timer shaft 35 is adapted to be rotated one revolution by conventional one revolution clutch means, not shown. The segment gear is suitably connected to the timer shaft so that when the timer shaft rotates one revolution the segment gear similarly rotates.

Operatively associated with the segment gear 36 is a pinion 40 having teeth 41 adapted to mesh with the teeth 39 and having a cam surface 42 engageable with segment gear cam 38. Pinion 40 is connected to a vertically extending shaft 44 by a pin 43. Shaft 44 is rotatable in support sleeve 45 carried on mounting bracket 46 supported on the timer shaft 35 by a sleeve 48. The timer shaft is rotatable relative to a sleeve 48. The location of sleeve 48, and thus the position of pinion 41, is variable using shims 49 interposed between sleeve 48 and segment gear 36, FIG. 2.

When pinion 40 is rotated by the segment gear, the shaft 44 is rotated. The upper end of the shaft 44 is connected by a pin 50 to a sprocket 51 around which chain 31 extends. Therefore, pinion 40 operates through the shaft 44, sprocket 51, chain 31, sprocket 30 and shaft 26 to rotate twister hook 25.

When in normal at-rest position, as shown in the drawings, the cam surface 42 of pinion 40 engages cam 38 on segment gear 36. It will be noted, FIGS. 1 and 2, that cam 42 is located axially spaced below gear teeth 41 on the pinion. During an operative cycle, and as the timer shaft 35 rotates to produce a tying operation, the segment gear rotates as indicated by the arrow 52 (FIG. 1), and the cam 42 slides along cam 38. It is during this portion of the rotation of the timer shaft that the needle means is projected across the bale case. When cam 42 rides off the tail end 54 (FIG. 1) of the cam 38, the gear teeth 39 on the segment gear come into engagement with the teeth 41 on the pinion. Further rotation of the segment gear causes a rotation of the pinion, the drive ratio being such through to the twister hook 25 that a desired number of rotations of the hook are provided. For example, the twister hook may be rotated four revolutions for each tying cycle to thereby provide a wire twist having four turns. A greater or lesser number of turns can be provided as desired, as will be readily understood, by changing the drive ratios provided.

At the last portion of segment gear rotation, the teeth 41 of pinion 40 leave gear teeth 39 and pinion cam 42 engages cam 38 on the segment gear. This re-establishes the starting operative position of the respective gears, FIG. 1. The position of the pinion when in at-rest position is critical to the operation of the tying mechanism. If the pinion becomes angularly displaced relative to its proper location, a tooth may be skipped when the segment gear teeth engage the teeth of the pinion. If this happens, some part will be broken. To achieve a proper operative relationship of the gears, it is necessary that two adjustment factors be considered. First, there must be a proper mesh between the segment gear teeth 39 and the pinion teeth 41 when the teeth are in engagement. Also, there must be proper engagement of cam surface 42 with cam surface 38. Adjustment of the pinion to achieve one of these adjustments may result in the other adjustment being improper. According to this invention, such problem is solved by providing a cam adjustment which is independent of the gear teeth adjustment.

The cam 42 on the pinion 40 comprises a wear plate 55 fastened to the body 56 of the pinion by screws 58. The wear plate 55 is countersunk at 57 to provide spaces for the heads 59 of the screws 58. Interposed between wear plate 55 and the body 56 of the pinion are shims or spacers 60, the number and thickness of which can be provided and varied as desired.

In assembling the parts, the operator first adjusts pinion 40 to achieve a proper mesh of the pinion teeth 41 and the segment gear teeth 39. This is done by varying the number of shims 49 and sliding sleeve 48 axially along shaft 35. Thereafter, the assembler shims the wear plate 55 so that it is brought into proper engagement with the cam 38 of the segment gear. Thus, tooth mesh and cam adjustments are provided and independent of each other.

As shown in FIG. 5, wire 15 is pulled tightly down over the roller 18 by the bale 20 being formed. This causes the wire to be pulled against the side of twister hook 25 and such pulling action subjects shaft 26 to a torque in the direction indicated by the arrow 64. Such torque is transmitted through spindle 26 to sprocket 30, through chain 31 to sprocket 51, and then through the shaft 44 to the pinion 40. If the clearance between the pinion cam surface 42 and the segment gear cam surface 38 is too great, the rotatable force of wire 15 on the twister hook will force the pinion angularly out of position. If the misalignment is above a certain amount, a tooth will be missed on opertion of the tier. However, with the adjustment provided in the present invention, no such clearance need exist between the pinion and the segment gear. The pinion cam can be set using the shims 60 to precisely the desired position and this will insure that the pinion will be properly located for operation of the tier. When plate 55 becomes worn, due to repeated operation of the typing mechanism and the relative movement of the surfaces 38 and 42, an additional shim 60 can be provided to compensate for such wear. In like respect, when the surface 42 becomes worn beyond a certain point, it is merely necessary to remove the wear plate 55 and replace it with a new one. It is not necessary to replace the whole pinion.

The adjustment factor provided in the design described, allows the assembler of the tying mechanism to quickly and easily set the segment gear and pinion in proper position relative to each other. Manufacturing tolerances do not have to be as closely held as heretofore required thereby reducing costs of production and assembly. Manufacturing, assembly, replacement and repair problems are all simplified by the design provided. Nevertheless, the cost of the arrangement is very small.

In the foregoing description, reference is made to a particular wire tying mechanism. However, segment gears and pinions of the type described are used in other wire tying mechanism and in twine tie mechanisms. This invention can be used in connection with any of these types of tying mechanism and while the invention has been described in connection with a particular embodiment thereof, it will be understood that it is capable of further modification and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention what I claim is:

1. In a hay baler, a bale case in which bales are formed, tying means mounted on said bale case and including a rotatable spindle, and means for operating said tying means comprising, in combination, a rotatable shaft, a segment gear mounted on said shaft and rotatable therewith, said segment gear having gear teeth and a cam section angularly spaced therefrom, a pinion gear having teeth engageable with the segment gear teeth and having a cam section engageable with the cam section of the segment gear, means for adjusting one gear relative to the other gear to secure proper mesh of the teeth of the respective gears when the teeth are in engagement, and means for adjusting one cam section relative to the gear of which it is a part and relative to the cam section of the other gear whereby proper clearance can be provided between said cam sections independently of the gear teeth adjustment.

2. In a hay baler, a bale case in which bales are formed, tying means mounted on said bale case and including a rotatable spindle, and means for rotating said spindle comprising, in combination, a rotatable shaft, a segment gear mounted on said shaft and rotatable therewith, said segment gear having gear teeth and an integral cam section angularly spaced from said gear teeth, a pinion having teeth engageable with the segment gear teeth and having a separate cam section engageable with the cam section of the segment gear, means for adjusting said pinion relative to said segment gear to secure proper mesh of the teeth of the respective parts when the teeth are in engagement, and means connecting said pinion cam section to the pinion for adjustment relative thereto and relative to the cam section of the segment gear whereby proper clearance can be provided between said cam sections independently of gear teeth adjustment.

3. In a hay baler as recited in claim 2 wherein said means connecting said pinion cam section to the pinion comprises a plurality of shims interposed between the pinion and said pinion cam section.

4. In a hay baler as recited in claim 2 wherein said pinion cam section is made of bearing material and said means connecting the cam section to the pinion comprises one screw at least, the cam section being countersunk to receive the head of the screw.

References Cited in the file of this patent

UNITED STATES PATENTS

| | | |
|---|---|---|
| 1,137,059 | Jones | Apr. 27, 1915 |
| 1,257,467 | Dudley | Feb. 26, 1918 |
| 1,355,706 | Snyder | Oct. 12, 1920 |
| 1,438,134 | Parker | Dec. 5, 1922 |
| 2,996,929 | Lazarowicz | Aug. 22, 1961 |

FOREIGN PATENTS

| | | |
|---|---|---|
| 760,666 | Great Britain | Nov. 7, 1956 |
| 824,498 | Great Britain | Dec. 2, 1959 |